United States Patent [19]

White et al.

[11] 4,429,923
[45] Feb. 7, 1984

[54] BEARING SUPPORT STRUCTURE

[75] Inventors: Richard T. White, West Hartford; Louis Kudlacik, Glastonbury, both of Conn.

[73] Assignee: United Technologies Corporation, Hartford, Conn.

[21] Appl. No.: 328,568

[22] Filed: Dec. 8, 1981

[51] Int. Cl.³ .......................................... F16C 27/00
[52] U.S. Cl. ................................................ 308/184 R
[58] Field of Search ................ 308/26, 189 R, 184 R, 308/184 A, 22, 28, 15

[56] References Cited

U.S. PATENT DOCUMENTS

| | | | |
|---|---|---|---|
| 3,205,024 | 9/1965 | Morley et al. | 308/184 R |
| 4,046,430 | 9/1977 | Buono et al. | 308/184 R |
| 4,084,861 | 4/1978 | Greenberg et al. | 308/184 R |
| 4,214,796 | 7/1980 | Monzel et al. | 308/184 R X |
| 4,336,968 | 6/1982 | Hibner | 308/184 A |

Primary Examiner—Stuart S. Levy
Assistant Examiner—David Werner
Attorney, Agent, or Firm—Charles A. Warren

[57] ABSTRACT

A bearing support structure in which an oil damping structure is combined with a mechanical centering structure between the oil damper and the bearing and in series with the oil damper to be effective in maintaining the rotor on its axis, the mechanical structure including a series of parallel rods surrounding the bearing and secured at one end to the fixed bearing support structure and at the other end to a ring located between the bearing and the oil damper.

1 Claim, 1 Drawing Figure

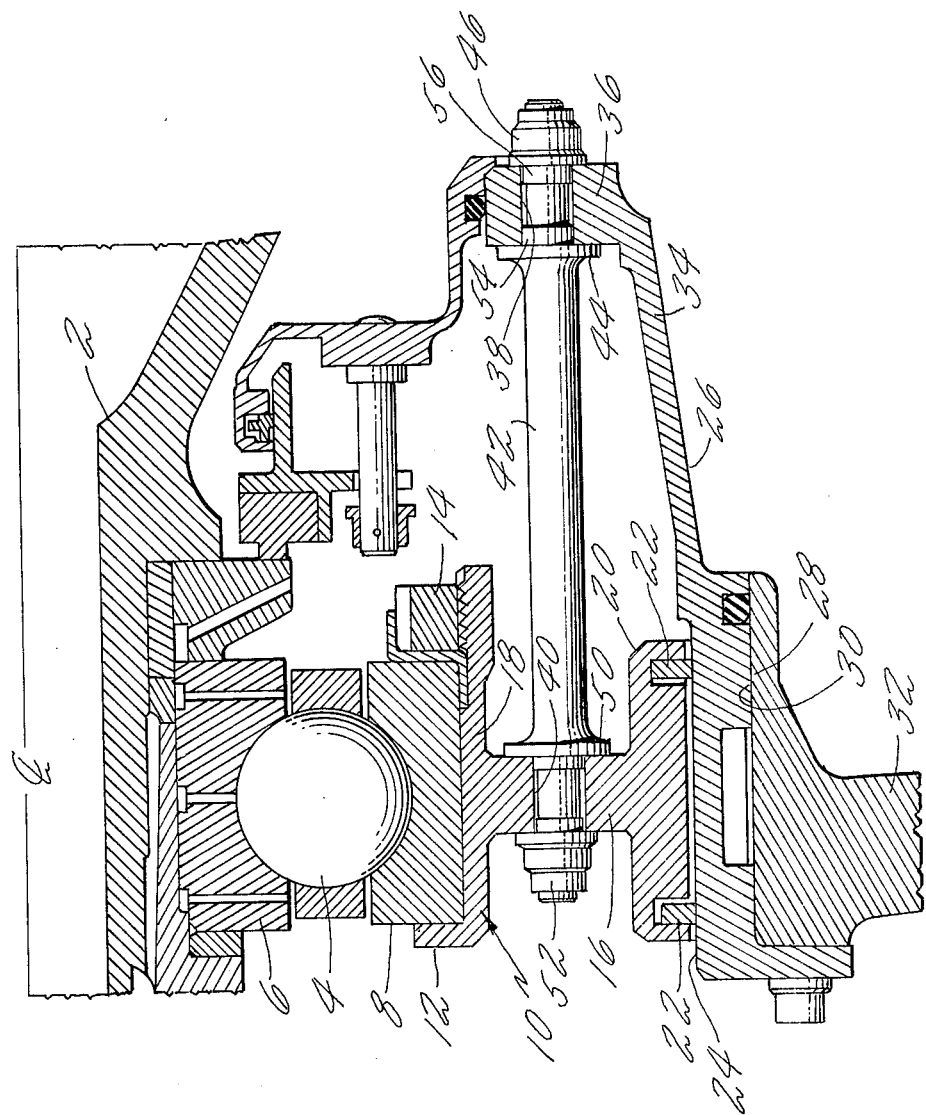

BEARING SUPPORT STRUCTURE

DESCRIPTION

1. Technical Field

This invention relates to a combined oil damping and mechanical centering structure for a shaft bearing particularly in the field of high performance gas turbine engines.

2. Background Art

With conventional oil damping structures for a rotary shaft the amplitude of the vibration is reduced by the damper but there is no mechanical structure associated therewith for centering the rotor on its own axis. This is a desirable feature in order that a minimum of rotor deflection will occur from the unbalance. To accomplish this a mechanical structure must be incorporated that will serve to center the shaft on its axis without affecting the damping action of the oil damping structure.

DISCLOSURE OF INVENTION

A feature of the invention is a mechanical supporting and centering device that will have such a spring rate as not to affect the associated oil damper structure and will serve to center the shaft.

Another feature is a centering structure that acts in series with the oil damper between the shaft and the surrounding static support structure.

According to the invention the oil damper is located between the shaft bearing and the support structure and between the damper and the bearing is a mechanical support structure that includes a row of rods surrounding the bearing attached to a fixed part of the structure at one end and at the other end to a ring surrounding the bearing and located between the bearing and the oil damping structure, this ring preferably being I-beam shaped in cross section and desirably carrying on its outer flange the inner element of the oil damping structure.

The foregoing and other objects, features and advantages of the present invention will become more apparent in the light of the following detailed description of the preferred embodiments thereof as shown in the accompanying drawing.

BRIEF DESCRIPTION OF THE DRAWING

The single FIGURE is a sectional view of a bearing support structure embodying the invention.

BEST MODE FOR CARRYING OUT THE INVENTION

As shown the shaft 2 is supported by a ball bearing 4 having an inner race 6 on the shaft and an outer race 8 secured in a ring 10 surrounding the bearing. The outer race may be held in place against the flange 12 by a clamping nut 14. The ring 10 is I-beam shape in cross-section and has the central radially extending disk portion 16 and the radially spaced apart integral cylindrical flanges 18 and 20. The race 8 is on the inner surface of flange 18.

The outer surface of outer flange 20 has spaced apart ring seals 22 in a position to engage a cylindrical surface 24 on an annular support 26. The space between the surfaces on the flange and the surface 24 forms an oil damper with oil under pressure supplied to this space. Radially outward of the surface 24 the support 26 has an outer cylindrical surface 28 fitting in a mating surface 30 on a static fixed support structure 32. The support 26 has an axially extending frustoconical section 34 on the end of which is an inwardly extending flange 36 having a row of axially extending holes 38 therein.

The holes 38 are in axial alignment with mating holes 40 in the disk portion of the ring 16 and a ring of rods 42 extend through these holes in parallel relation to one another and parallel to the shaft axis. Each of the rods 42 has a flange 44 engaging the inner surface of flange 36 and is held securely in the associated hole 38 by a clamping nut 46. At the other end a flange 50 engages on the disk portion 16 and is held against this portion by a clamping nut 52. For best results each bolt has two spaced bearing surfaces 54 and 56 engaging in the associated hole. One surface 54 is close to the adjacent flange and is a press fit with the hole in which it is received. The other surface 56 is adjacent the other end of the hole and is a loose fit therein. This arrangement prevents wear between the flanges on the rods and the associated part through which the rods extend.

The use of this series of rods, in conjunction with the oil damper serves to minimize the deflection of the rotor due to temporary imbalances of the rotor to avoid contact of the blade tips of the engine with the surrounding case. The rods also maintain concentricity of the rotor with the surrounding supporting structure when the turbine is not in operation and during starting before the oil damper is effective. The oil damper reduces the amplitude of the vibration induced by an unbalanced load and the parallel rods act to center the rotor. The rod spring rate is desirably low so that the damping dynamic loading is carried primarily by the oil damper for maximum damper effectiveness. Obviously the mechanical spring rate may be varied over a large range by changing the length, diameter and number of rods as well as the materials of these rods.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. In a bearing support construction:
   a fixed supporting structure;
   a shaft positioned within said structure;
   a bearing for the shaft having an outer race;
   a supporting ring for said outer race;
   an oil damping structure surrounding said ring and including an annular member having an inner cylindrical surface and having a mounting flange thereon;
   said supporting ring having an outer cylindrical surface located adjacent to and spaced radially inward of said inner cylindrical surface to define therebetween an oil damping space;
   said annular member having an inwardly extending flange at the end remote from the cylindrical surface;
   a plurality of rods extending from said flange to said supporting ring and secured in both; and
   the supporting ring being I-beam in shape with a disk portion to receive the rods and having integral cylindrical flanges one supporting the outer race and the other having the outer cylindrical surface for the oil damper.

* * * * *